METHOD OF MAKING A MAGNETIC TRANSDUCER

Filed June 29, 1959 4 Sheets-Sheet 1

INVENTORS
FRANK T. KRISTIANSEN
HAROLD W. PEXTON
BY
Geoffrey Knight
ATTORNEY

Nov. 20, 1962 F. T. KRISTIANSEN ETAL 3,064,333

METHOD OF MAKING A MAGNETIC TRANSDUCER

Filed June 29, 1959 4 Sheets-Sheet 2

Nov. 20, 1962 F. T. KRISTIANSEN ETAL 3,064,333

METHOD OF MAKING A MAGNETIC TRANSDUCER

Filed June 29, 1959 4 Sheets-Sheet 3

Nov. 20, 1962 F. T. KRISTIANSEN ETAL 3,064,333

METHOD OF MAKING A MAGNETIC TRANSDUCER

Filed June 29, 1959 4 Sheets-Sheet 4

United States Patent Office 3,064,333 Patented Nov. 20, 1962

3,064,333

METHOD OF MAKING A MAGNETIC TRANSDUCER

Frank T. Kristiansen and Harold W. Pexton, Poughkeepsie, N.Y., assignors to International Business Machines Corporation, New York, N.Y., a corporation of New York Filed June 29, 1959, Ser. No. 823,394
6 Claims. (Cl. 29—155.56)

This invention pertains to a method of making composite structures requiring great accuracy of relative positioning of the units of such structures and more particularly to the method of making multichannel magnetic transducers.

A multichannel magnetic transducer usually consists of a plurality of individual channel units separated by shields, said individual channel units containing one or more magnetic heads, each individual magnetic head consisting of a plurality of components among which are two pole pieces separated by an air gap.

In constructing a precision multichannel magnetic transducer, three of the major alignment problems encountered are, first, the alignment of the components which comprise each individual channel unit so that the channels may be made as narrow as possible, second, the spacing of the individual channel units across the transducer so that each individual channel unit will contact a specific strip of the recording medium, any error in spacing not being cumulative, and third, the alignment of the pole tips in precise planes across the transducer so that all the individual heads will read characters simultaneously.

The prior art shows assembly methods where some, but not all of the alignments mentioned may be accurately controlled. Alignment of the pole pieces for each individual channel unit may be insured by assembling the transducer with shields which extend across the air gaps; however, such transducers are not separable at the air gaps and therefore the planes containing the pole tips cannot be lapped to insure accurate alignment of the pole tips.

Heads, separable at the air gaps so that the faces containing the pole tips may be tapped, are assembled by separately assembling the components of the transducer which are on each side of an air gap. However, such methods of assembly provide no means for directly controlling the alignment between the components of each individual channel unit which are on different sides of the air gap.

The limitations inherent in previous assembly methods are overcome by this invention by first assembling the transducer in a fixture using shields which extend across the air gaps, thereby controlling the alignment between the components of the individual channel units which are on different sides of the air gaps. After an adhesive material which holds the various components in place has hardened, these shields are cut at the air gaps, separating the transducer into a plurality of subassemblies and exposing the pole tips so that they may be lapped into alignment. At this point in the operation we have produced a set of subassemblies which satisfy the second and third requirements set out above. In the final step of the process the assemblies are reunited by some accurate aligning means so that the final product satisfies all of the requirements set out above including the first one. Note that the final step is possible only because the individual subassemblies were made by a process which results in subassemblies wherein the spacing of the individual channel units across the transducer was accurately controlled, any errors in spacing not being cumulative (i.e., the second requirement set out above).

The object of the invention is to provide an improved method of assembling precision magnetic transducers which will meet all the above-mentioned requirements.

A further object of this invention is to provide a method of assembling a multichannel magnetic transducer where the alignment of the components of each individual head, the alignment of the pole tips and the spacing of the individual heads across the transducer may all be accurately controlled.

A further object is to provide an improved method of making a multichannel magnetic transducer for use with narrow channels.

The foregoing and other objects, features and advantages of the invention will be apparent from the following more particular description of a preferred embodiment of the invention, as illustrated in the accompanying drawings.

Figure 1:
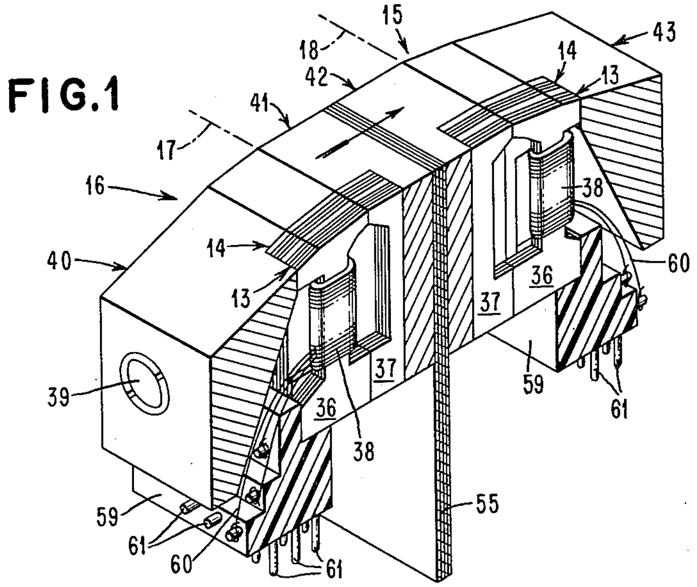
FIG. 1 is a cut away view of a finished head.

The assembled transducer as shown in FIG. 1 is for use in a system where a magnetic medium is moved past the transducer in a direction parallel to the arrow shown. As the magnetic medium, hereinafter called tape, moves past the head each strip of the medium, hereinafter called channel, will come into contact with two of the magnetic heads.

Head 15 is used to magnetize tthe tape in accordance with some information carrying code (called writing) and head 16 is used to produce a signal in accordance with the coded magnetization of the tape (called reading).

As previously pointed out this invention provides an assembly method whereby the components of the transducer may be accurately aligned thereby allowing the channels to be made narrower, while still providing magnetic heads which can be separated at the air gap planes 17 and 18 so that the pole faces may be lapped to insure that the pole tips in the various channels are aligned.

Figure 2:
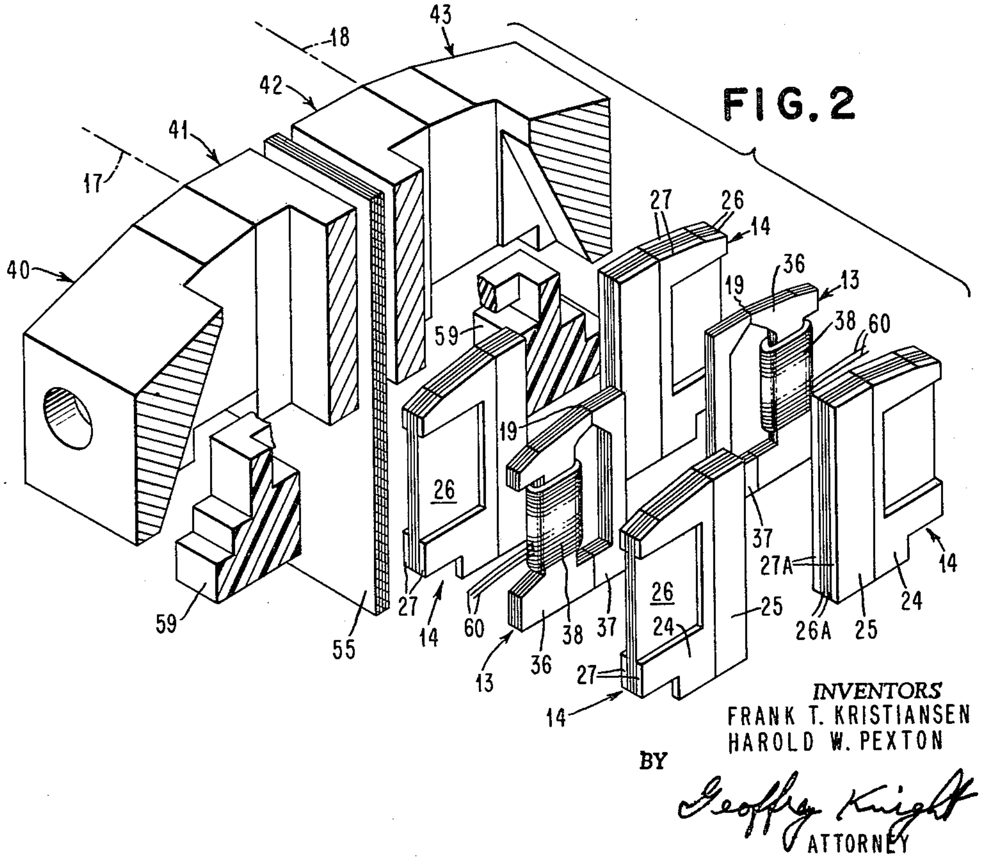
FIG. 2 is an exploded perspective view of a portion of a finished head.

The transducer to be assembled (FIG. 1) comprises write head 15, and read head 16, said heads consisting of the individual channel heads 13 and shields 14. As shown in FIG. 2, the individual heads 13 comprise laminated pole pieces 36 and 37 and coil 38, and shields 14 comprise parts 24 and 25. The pole pieces for each individual channel head 13 are separated at one of the points where they meet (point 19) by a thin sheet of nonmagnetic material. Parts 24 of shields 14 comprise a plurality of sheets of magnetic material 26 between bronze spacers 27 while parts 25 comprise a like plurality of sheets of nonmagnetic material 26A between bronze spacers 27A. In the embodiment shown the well-known commercially available polyester fiber "Mylar" was used to separate the air gaps at points 19 and the well-known commercially available iron nickle alloy "Hy Mu 80" was used for parts 26.

Write head 15 is surrounded by frame components 42 and 43 and read head 16 is surrounded by frame components 40 and 41. The frame components are held together by dowel bolts 39 (FIG. 1), components 41 and 42 being separated by shield 55. In the embodiment shown, shield 55 is a combination of "Hy Mu 80" for magnetic shielding and phosphor bronze for eddy current shielding.

Figure 4:
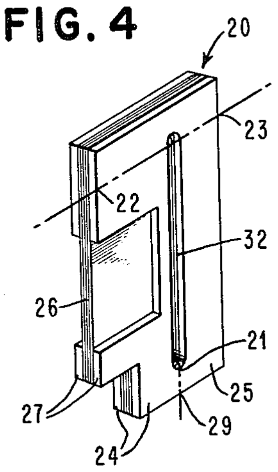
FIG. 4 is a perspective view of one of the shield assemblies as manufactured.

The shields 24 and 25 are initially in one piece as shown in FIG. 4. However, during the assembly procedure (as will be explained) the shields are cut between points 22 and 23 and between points 29 and 21 thereby giving us shields 24 and 25.

Figure 5:
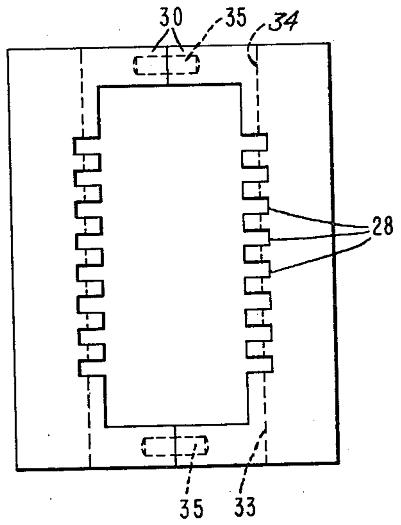
FIG. 5 is a schematic view of the fixture for holding the shield assemblies.
Figure 6:
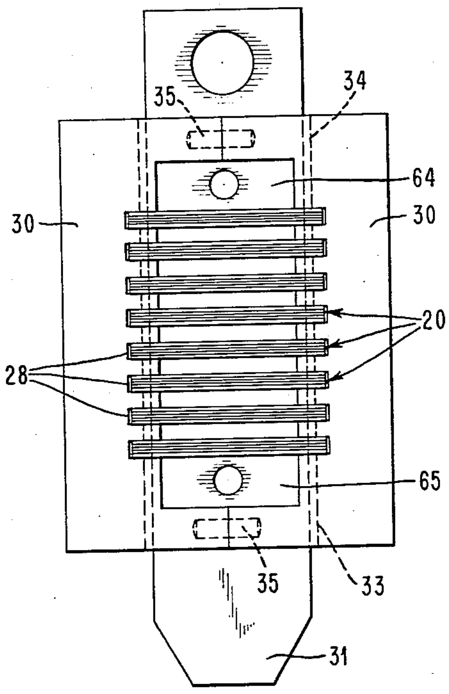
FIG. 6 is a schematic view of the fixture for holding the shield assemblies with the shield assemblies and tongue inserted.
Figure 7:
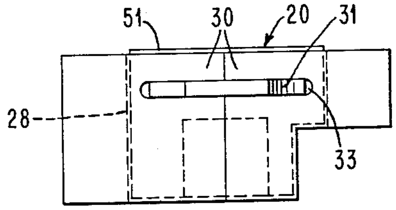
FIG. 7 is a side elevation view of FIG. 6.

Briefly described the assembly method comprises the steps of assembling a first and second subassembly, said subassemblies respectively holding the write head 15 and the read head 16. These subassemblies are each assembled by placing the shields 20 (FIG. 4) in the slots 28 of fixture 30 (FIG. 5). The shields are held in place by the tongue 31 (FIGS. 6 and 7) which extends through the openings 32 in each shield and which fits into slots 33 and 34 in the sides of fixture 30. Fixture 30 comprises two parts held together by dowels 35.

Pole pieces 37 are placed between the shields on one side of tongue 31 (FIG. 9) and pole pieces 36 with coil 38 are placed between the shields on the other side of tongue 31. The shields which now extend across the entire length of pole pieces 36 and 37 are used to insure accurate alignment of these pole pieces. The pole pieces for write head 15 and read head 16 may be of different widths to give the effect known as wide write, narrow read. To compensate for the different width of the heads the shields 14 of write head 15 will be of a different width than the shields 14 for read head 16.

Figure 10:
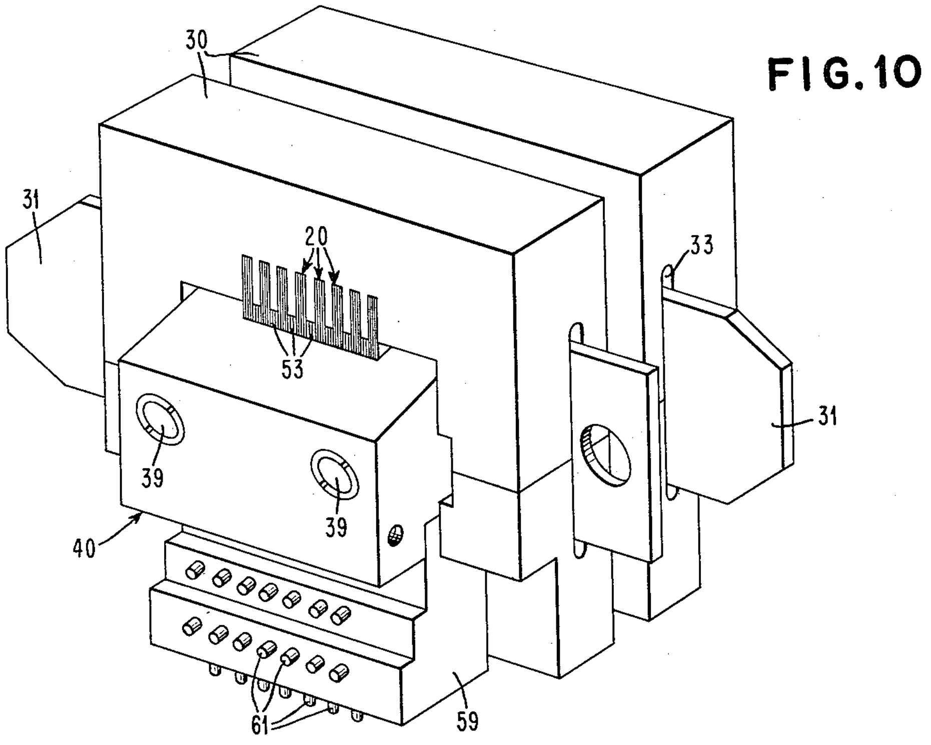
FIG. 10 is the assembly ready for curing.

The frame components 40, 41, 42 and 43 which have holes for aligning dowel bolts 39 accurately drilled therein are inserted into the sub-fixtures and bolted together. The two fixtures are held in alignment by the dowel bolts in the frame as the entire unit is cured, solidifying the epoxy resin with which all the parts were coated, and forming the entire assembly into one solid mass. (The assembly with fixtures will appear as shown in FIG. 10.)

Figure 11:
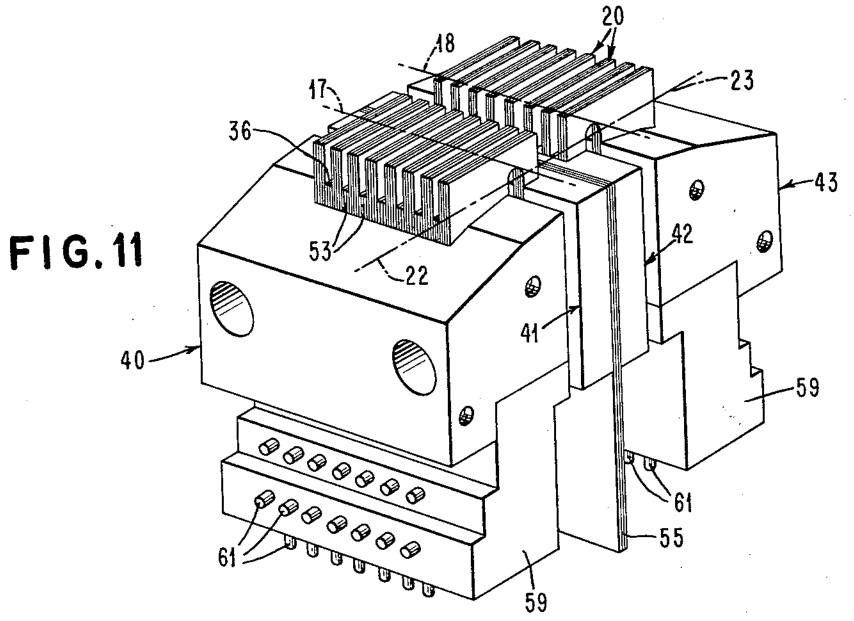
FIG. 11 is the assembly after curing with the fixture removed.

After curing the tongues 31 are removed thereby freeing the head assembly from the fixtures (the assembly will now appear as shown in FIG. 11). The shield assemblies are then cut between points 29 and 21 and between points 22 and 23 (see FIGS. 4 and 11) thereby separating the assembly into sections at the air gap planes 17 and 18 and exposing the pole tips so that they may be laped into alignment. After being lapped the subassemblies are reassembled using previously machined dowel holes in the frame components to realign the subassembly. Since the components in each subassembly are cemented to their respective frame component and the dowel holes were aligned during the original assembly at which time the other components were aligned by the fixture and the shields, the realignment between the components on each side of the air gaps is re-established.

Figure 3:
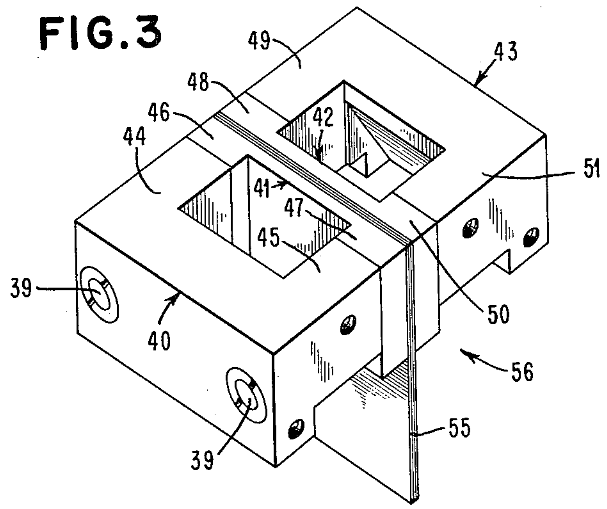
FIG. 3 is a perspective view of the frame components.

A more detailed description of the method follows:

Frame components 40, 41, 42 and 43 (FIG. 3) are somewhat U-shaped pieces of nonmagnetic material.

The read head 16 will eventually fit between arms 44, 45, 46 and 47 and the write head 15 will fit between arms 48, 49, 50 and 51. The holes for dowel bolts 39 which will be used to hold the completed head in alignment are simultaneously drilled in components 40, 41, 42 and 43 by holding all of said parts of the frame in a jig. The holes are reamed while the parts are still in the jig in order to insure accuracy.

After the holes for the dowel bolts 39 are drilled, the frame components 41 and 42 are riveted together with shield 55 held between them. The holes wherein dowel bolt 39 will eventually fit are used for alignment during the riveting operation. The combination of components 41, 42 and 55 will hereinafter be referred to as center assembly 56.

Two subassemblies are fabricated by placing shield assemblies 20 (FIG. 4) which consist of several sheets 26 of the previously described "Hy Mu 80" between two bronze spacers 27, in slots 28 of sub-fixtures 30 (FIG. 5). The shields 20 are engaged and held in place by tongue 31, said tongue 31 engaging slots 32 in each shield assembly and fitting through slots 33 and 34 in the sides of sub-fixtures 30 (shown schematically in FIGS. 6 and 7). The laminated sections 37 are first coated with thermosetting epoxy resin which has a high dimensional stability (such as the well-known commercially available Araldite) and inserted between the shields on one side of tongue 31. One of the subassemblies holds pole pieces 37 of head 15 and the other holds pole pieces 37 of head 16. After hardening the epoxy resin by curing, in an oven, the surface 50 of pole pieces 37 and the surface 51 of the shield assemblies 20 are finished flush with the surfaces of the fixtures.

Figure 8:
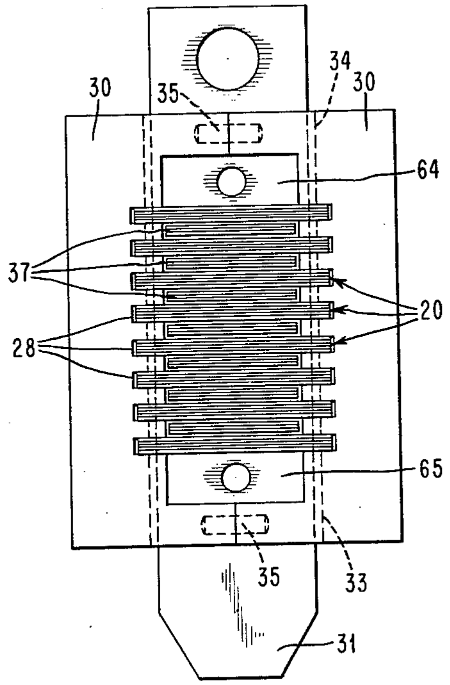
FIG. 8 is a schematic veiw of the fixture with the pole pieces inserted.
Figure 9:
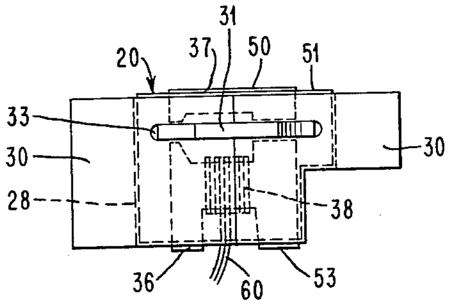
FIG. 9 is a side elevation view of FIG. 8.

The pole pieces 36 about which is tightly wound a coil 38 to which are attached lead wires 60 are coated with the same epoxy resin previously described and then inserted between the shields of their respective fixtures on the opposite side of tongue 31 from pole pieces 37 (FIGS. 8 and 9). Pole pieces are so designed that the ends 53 of pole pieces 36 (FIG. 9) extend slightly past the end of the shield assemblies 20. Hence, in the finished head, all the pole pieces have a solid bearing surface on the frame components and the epoxy resin does not have to withstand the strain due to the friction of the tape moving over the head. It will be noted that at this stage of the assembly the pole pieces 36 and 37 are separated by the width of the tongue 31.

Connector block 59 (FIG. 1) is put in place and the coil wires 60 are connected to the connector pins 61 one row at a time with a sheet of non-conducting material between the rows in order to help prevent short circuits between the wires.

The alignment of the components of each individual head assembly, which are on opposite sides of the air gap, is insured since they are held in alignment by the shields which now extend across the air gap. Accurate spacing between channels is assured since the location of each shield is established by its particular slot in the fixture. Furthermore, any error in spacing is not cumulative.

Frame section 40 is inserted into the fixture which holds the read head 16 and frame section 43 is inserted into the fixture which holds the write head 15 by placing arms 44, 45, 49 and 51 in the respective slots 64 and 65 of the two fixtures 30. Arms 46, 47, 48 and 50 of center section 56 are then placed in slots 64 and 65 of the two fixtures on the opposite side of tongue 31 than arms 44, 45, 49 and 51.

The two fixtures one of which holds the read head and the other of which holds the write head are secured together and aligned by bolting them together with dowel bolt 39. The assembly will now appear as shown in FIG. 10.

The entire assembly is then placed in an oven and cured, thereby hardening the epoxy resin which coats all the mating surfaces, and forming the entire head into one solid coherent mass.

After curing, the fixtures may be removed by removing the dowel bolts 39 and then pulling tongues 31 out of the fixtures. (See FIG. 11.) The shield assemblies are now cut between points 29 and 21 and between points 22 and 23. (See FIGS. 4 and 11.) This cutting separates the head into three assemblies, the read assembly, comprising pole pieces 36 of head 16; the write assembly, comprising pole pieces 36 of head 15 and the center section assembly which comprises pole pieces 37 of heads 15 and 16.

The pole tips which face planes 17 and 18 are thereby exposed and they now may be lapped to any desired precision of alignment in order to insure that all the pole faces for the individual channels will be aligned across the head. Special attention is focused on insuring that the two faces of the center section assembly are parallel.

Before lapping, the three sections are filled with a casting resin to insure mechanical stability. After the pole faces are lapped the three sections are bolted together with a "Mylar" shim in gaps 19 and then the top surface of the head is finished to the desired shape.

Pole pieces 36 and 37 could also be manufactured in one piece to be cut after assembly. However, the pressure on pole pieces during the cutting might tend to misalign the cores, hence, it is found somewhat better to cut only the shields.

In the embodiment shown herein dowel bolts were used as the uniting means; however, any other accurate aligning means could be used.

A two gap head has been shown herein, however, the method is equally applicable to single gap and multigap heads.

While the invention has been particularly shown and described with reference to a preferred embodiment thereof, it will be understood by those skilled in the art that the foregoing and other changes in form and details may be made therein without departing from the spirit and scope of the invention.

We claim:

1. The method of making a multichannel magnetic transducer comprising the steps of:
accurately aligning frame components by an aligning means;
placing a plurality of shields in a fixture, said fixture holding said shields in a predetermined relationship with each other, said shields having slots therein, said slots aligned to define an air gap plane, said shields extending across said air gap plane;
accurately engaging said shields, thru said slots, by engaging means;
inserting individual magnetic heads adjacent said shields, said magnetic heads deriving their alignment from said shields, each of said magnetic heads comprising two pole pieces, the first of said pole pieces being on one side of said air gap plane, the second of said pole pieces being directly opposite said first pole piece on the other side of said air gap plane, said pole pieces having faces abutting said engaging means;
binding said frame components, shields, pole pieces and fixture together into a unitary assembly;
cutting said unitary assembly at said air gap plane exposing said faces of said pole pieces, forming a plurality of sections thereby, each of said sections containing a frame component;
accurately finishing said faces exposed by said cutting;
and reuniting said frame components by use of said aligning means, whereby said pole pieces have the same alignment as before said unitary assembly was cut.

2. The method of making a multichannel multiunit magnetic transducer comprising the steps of:
accurately aligning a plurality of frame components by an aligning means;
placing a plurality of shields in fixtures, said fixtures holding said shields in a predetermined relationship with each other, said shields having slots therein, said slots aligned to define air gap planes, said shields extending across said air gap planes;
accurately engaging said shields, thru said slots, by engaging means;
inserting individual magnetic heads adjacent said shields, said magnetic heads deriving their alignment from said shields, each of said magnetic heads comprising two pole pieces, each of said units comprising a plurality of individual magnetic heads, the first of said pole pieces being on one side of an air gap plane, the second of said pole pieces being directly opposite said first pole piece on the other side of said air gap plane, said pole pieces having faces abutting said engaging means;
binding said frame components, shields, pole pieces and fixtures together into a unitary assembly, said units being held in alignment with each other by said frame components;
cutting said unitary assembly at said air gap planes exposing said faces of said pole pieces, forming a plurality of sections thereby, each of said sections containing a frame component;
accurately finishing said faces exposed by said cutting;
and reuniting said frame components by use of said aligning means, whereby said pole pieces have the same alignment as before said unitary assembly was cut.

3. The method of making a multichannel magnetic transducer comprising the steps of:
accurately aligning frame components by an aligning means;
placing a plurality of shields in a fixture, said fixture accurately holding said shields in parallel planes, said shields having slots therein, said slots aligned to define an air gap plane, said shields extending across said air gap plane;
accurately engaging said shields, thru said slots, by engaging means to ensure that all of said slots lie in said air gap plane;
inserting individual magnetic heads adjacent and between said shields, said magnetic heads deriving their alignment from said shields, each of said magnetic heads comprising two pole pieces, the first of said pole pieces being on one side of said air gap plane, the second of said pole pieces being directly opposite said first pole piece on the other side of said air gap plane, said pole pieces having faces abutting said engaging means;
binding said frame components, shields, pole pieces and fixture together into a unitary assembly;
cutting said unitary assembly at said air gap plane exposing said faces of said pole pieces, forming a plurality of sections thereby, each of said sections containing a frame component;
accurately finishing said faces exposed by said cutting;
and reuniting said frame components by use of said aligning means, whereby said pole pieces have the same alignment as before said unitary assembly was cut.

4. The method of making a multichannel multiunit magnetic transducer comprising the steps of:
accurately aligning a plurality of frame components by an aligning means;
placing a plurality of shields in fixtures, said fixtures accurately holding said shields in parallel planes, said shields having slots therein, said slots aligned to define air gap planes, said shields extending across said air gap planes;
accurately engaging said shields, thru said slots, by engaging means to ensure that each of said slots lies in an air gap plane;
inserting individual magnetic heads adjacent and between said shields, said magnetic heads deriving their alignment from said shields, each of said magnetic heads comprising two pole pieces, each of said units comprising a plurality of individual magnetic heads, the first of said pole pieces being on one side of an air gap plane, the second of said pole pieces being directly opposite said first pole piece on the other side of said air gap plane, said pole pieces having faces abutting said engaging means;
binding said frame components, shields, pole pieces and fixtures together into a unitary assembly, said units being held in alignment with each other by said frame components;

cutting said unitary assembly at said air gap planes exposing said faces of said pole pieces forming a plurality of sections thereby, each of said sections containing a frame component;

accurately finishing said faces exposed by said cutting; and reuniting said frame components by use of said aligning means, whereby said pole pieces have the same alignment as before said unitary assembly was cut.

5. The method of making a multichannel transducer comprising the steps of:

accurately aligning frame components by an aligning means;

placing a plurality of shields in a fixture, said fixture being adapted to accurately hold said shields in parallel planes and having a groove therein to accurately position a tongue, said shields having slots therein, said slots aligned to define an air gap plane, said shields extending across said air gap plane;

engaging said shields, thru said slots, by said tongue to ensure that all of said slots lie in said air gap plane;

inserting individual magnetic heads adjacent and between said shields, said magnetic heads deriving their alignment from said shields, each of said magnetic heads comprising two pole pieces, the first of said pole pieces being on one side of said air gap plane, the second of said pole pieces being directly opposite said first pole piece on the other side of said air gap plane, said pole pieces having faces abutting said engaging means;

binding said frame components, shields, pole pieces and fixture together into a unitary assembly;

cutting said unitary assembly at said air gap plane exposing said faces of said pole pieces, forming a plurality of sections thereby, each of said sections containing a frame component;

accurately finishing said faces exposed by said cutting; and reuniting said frame components by use of said aligning means, whereby said pole pieces have the same alignment as before said unitary assembly was cut.

6. The method of making a multichannel multiunit magnetic transducer comprising the steps of:

accurately aligning a plurality of frame components by an aligning means;

placing a plurality of shields in fixtures, said fixtures being adapted to accurately hold said shields in parallel planes and having grooves therein to accurately position tongues, said shields having slots therein, said slots aligned to define air gap planes, said shields extending across said air gap planes;

engaging said shields, thru said slots, by said tongues to ensure that each of said slots lies in an air gap plane;

inserting individual magnetic heads adjacent and between said shields, said magnetic heads deriving their alignment from said shields, each of said magnetic heads comprising two pole pieces, each of said units comprising a plurality of individual magnetic heads, the first of said pole pieces being on one side of an air gap plane, the second of said pole pieces being directly opposite said first pole piece on the other side of said air gap plane, said pole pieces having faces abutting said engaging means;

binding said frame components, shields, pole pieces and fixtures together into a unitary assembly, said units being held in alignment with each other by said frame components;

cutting said unitary assembly at said air gap planes exposing said faces of said pole pieces, forming a plurality of sections thereby, each of said sections containing a frame component;

accurately finishing said faces exposed by said cutting; and reuniting said frame components by use of said aligning means, whereby said pole pieces have the same alignment as before said unitary assembly was cut.

References Cited in the file of this patent

UNITED STATES PATENTS

| | | |
|---|---|---|
| 2,181,269 | Gehret | Nov. 28, 1939 |
| 2,756,280 | Rettinger | July 24, 1956 |
| 2,769,866 | Kornei | Nov. 6, 1956 |
| 2,865,086 | Whipple | Dec. 23, 1958 |
| 2,872,530 | Jolly | Feb. 3, 1959 |

FOREIGN PATENTS

| | | |
|---|---|---|
| 744,960 | Great Britain | Feb. 15, 1956 |
| 801,904 | Great Britain | Sept. 4, 1958 |
| 802,396 | Great Britain | Oct. 1, 1958 |